US012780263B2

(12) United States Patent
Tohmiya

(10) Patent No.: US 12,780,263 B2
(45) Date of Patent: Nov. 3, 2026

(54) MOVING SUPPORT DEVICE, MOVING SUPPORT METHOD, AND STORAGE MEDIUM FOR PROMPTING OPERATION DURING AUTOMATED DRIVING MODE

(71) Applicant: HONDA MOTOR CO., LTD., Tokyo (JP)

(72) Inventor: Koji Tohmiya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 11 days.

(21) Appl. No.: 19/012,389

(22) Filed: Jan. 7, 2025

(65) Prior Publication Data

US 2025/0289479 A1 Sep. 18, 2025

(30) Foreign Application Priority Data

Mar. 13, 2024 (JP) ................................ 2024-038915

(51) Int. Cl.
*B60W 60/00* (2020.01)
*B60W 50/08* (2020.01)

(52) U.S. Cl.
CPC .......... *B60W 60/005* (2020.02); *B60W 50/08* (2013.01)

(58) Field of Classification Search
CPC ........... B60W 60/005; B60W 60/0051; B60W 60/0053; B60W 50/14; B60K 35/28; B60K 35/10; B60K 35/29; G05D 1/0061; G06V 20/597
See application file for complete search history.

(56) References Cited

U.S. PATENT DOCUMENTS

2017/0232297 A1* 8/2017 Prokhorov ......... A63B 22/0025 482/8

FOREIGN PATENT DOCUMENTS

JP 2017-210027 A 11/2017
JP 2019092933 A * 6/2019

OTHER PUBLICATIONS

Translation of Junya (Year: 2019).*
Translation Junya (Year: 2019).*

* cited by examiner

*Primary Examiner* — Kenneth J Malkowski
(74) *Attorney, Agent, or Firm* — Rankin, Hill & Clark LLP

(57) ABSTRACT

The moving support device is used in a mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver. The moving support device includes an operation recommendation section that outputs operation recommendation information to prompt the operation of the driving operation section from an information output device that outputs information by means of at least one of an image or a sound used in the mobile body, while the mobile body moves in the automated driving mode.

8 Claims, 5 Drawing Sheets

MOVING SUPPORT DEVICE, MOVING SUPPORT METHOD, AND STORAGE MEDIUM FOR PROMPTING OPERATION DURING AUTOMATED DRIVING MODE

INCORPORATION BY REFERENCE

The present application claims priority under 35 U.S.C. § 119 to Japanese Patent Application No. 2024-038915 filed on Mar. 13, 2024. The content of the application is incorporated herein by reference in its entirety.

BACKGROUND OF THE INVENTION

Field of the Invention

The present invention relates to a moving support device, a moving support method, and a storage medium.

Description of the Related Art

Conventionally, a technique has been proposed, which uses a steering wheel of a steering device in a steer-by-wire system that is provided in a vehicle capable of switching between manual driving and automated driving, as an operation means for information contents displayed on a display device of the vehicle during the automated driving (see, for example, Japanese Patent Laid-Open No. 2017-210027).

In a case where a driver of a vehicle capable of switching between manual driving and automated driving moves by switching the driving mode to the automated driving, it is conceivable to provide to the driver an environment allowing a more comfortable moving time using a driving operation section such as a steering wheel.

The present invention has been made in view of such a background, and has an object of providing a moving support device, a moving support method, and a storage medium that provide such an environment allowing a more comfortable moving time using the driving operation section when a driver of a mobile body, such as a vehicle, moves by setting automated driving.

SUMMARY OF THE INVENTION

A first aspect to achieve the aforementioned object may include a moving support device used in a mobile body, the mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver, in which the moving support device includes an operation recommendation section that outputs operation recommendation information to prompt the operation of the driving operation section from an information output device that outputs information by means of at least one of an image or a sound used in the mobile body, while the mobile body moves in the automated driving mode.

The aforementioned moving support device may include an operating condition recognition section that recognizes an operating condition of the driving operation section by the driver, and the operation recommendation section may be configured to output, from the information output device, the operation recommendation information designating an operation content to the driving operation section; and stop outputting the operation recommendation information from the information output device when the operating condition recognition section recognizes the operation of the driving operation section in accordance with the operation content having been performed after outputting of the operation recommendation information from the information output device is started.

The aforementioned moving support device may include an operating condition recognition section that recognizes an operating condition of the driving operation section by the driver, and the operation recommendation section may be configured to output, from the information output device, the operation recommendation information designating an operation content to the driving operation section; and output, from the information output device, the operation recommendation information designating an operation content with a strength of the operation of the driving operation section lower than the strength of the operation of the driving operation section designated by the operation content of the operation recommendation information previously outputted, when the operating condition recognition section does not recognize the operation of the driving operation section in accordance with the operation content having been performed after the operation recommendation information is outputted from the information output device and before a predetermined time elapses.

In the aforementioned moving support device, the operation recommendation section may be configured to increase a strength of the operation of the driving operation section prompted by the operation recommendation information as a moving continuation time of the mobile body in the automated driving mode becomes longer.

In the aforementioned moving support device, the operation recommendation section may be configured to change the strength of the operation of the driving operation section prompted by the operation recommendation information by changing a number of times of the operation of the driving operation section prompted by the operation recommendation information.

In the aforementioned moving support device, the driving operation section may have a function of changing an input level necessary for the operation, and the operation recommendation section may be configured to change the strength of the operation of the driving operation section prompted by the operation recommendation information by changing the input level necessary for the operation of the driving operation section.

In the aforementioned moving support device, the driving operation section may include: a driving operation section for an upper half body operated by a site of the upper half body of the driver; and a driving operation section for a lower half body operated by a site of the lower half body of the driver, the operation recommendation information includes: operation recommendation information for an upper half body target that prompts the operation of the driving operation section for the upper half body; and operation recommendation information for a lower half body target that prompts the operation of the driving operation section for the lower half body, and the operation recommendation section may be configured to alternately outputs, from the information output device, the operation recommendation information for the upper half body target and the operation recommendation information for the lower half body target.

A second aspect to achieve the aforementioned object may include a moving support method executed by a computer used in a mobile body, the mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver, in which the moving support method includes an operation recommending step of outputting operation recommendation information to prompt the operation of the driving operation section from an information output device that outputs information by means of at least one of an image or a sound used in the mobile body, while the mobile body moves in the automated driving mode.

A third aspect to achieve the aforementioned object may include a non-transitory computer-readable storage medium storing a program configured to cause a computer to function as an operation recommendation section, the computer used in a mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver, in which the operation recommendation section outputs operation recommendation information to prompt the operation of the driving operation section from an information output device that outputs information by means of at least one of an image or a sound used in the mobile body, while the mobile body moves in the automated driving mode.

According to the aforementioned moving support device, moving support method, and storage medium, it is possible to provide an environment allowing a more comfortable moving time using a driving operation section when a driver of a mobile body, such as a vehicle, moves by setting automated driving.

DETAILED DESCRIPTION OF THE INVENTION

1. Use Aspect of Moving Support Device

Figure 1:
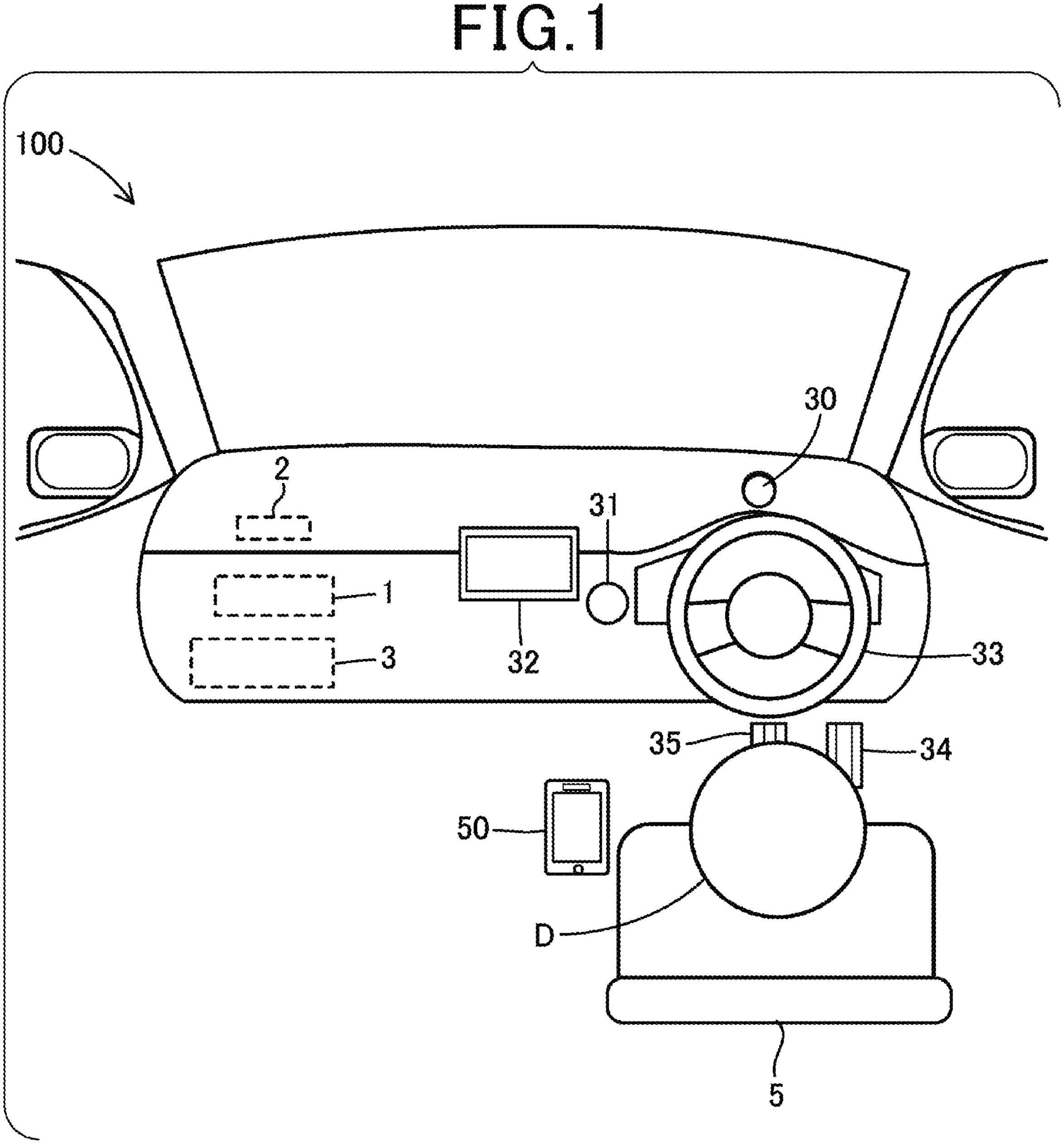
FIG. 1 is an explanatory view of a use aspect of a moving support device.

With reference to FIG. 1, a use aspect of a moving support device 1 of the present disclosure will be described. The moving support device 1 is mounted on a vehicle 100. The vehicle 100 includes a communication unit 2, an ECU (Electronic Control Unit) 3, a driver monitoring camera 30, a speaker 31, a display 32, a steering wheel 33, an acceleration pedal 34, and a brake pedal 35.

The vehicle 100 corresponds to a mobile body of the present disclosure. The steering wheel 33, the acceleration pedal 34, and the brake pedal 35 correspond to a driving operation section of the present disclosure. Hereinafter, the steering wheel 33, the acceleration pedal 34, and the brake pedal 35 are also collectively referred to as the driving operation section. The speaker 31 and the display 32 correspond to an information output device of the present disclosure. The communication unit 2 includes a transmitter and a receiver and wirelessly communicates with a communication terminal 50 used by a driver D, via Bluetooth (registered trademark), for example. The communication terminal 50 is a smartphone, a tablet terminal, a mobile phone, or the like.

The ECU 3 includes a processor and switches between a manual driving mode of performing travel control (moving control) of the vehicle 100 in accordance with an operation of the driving operation section by the driver D and an automated driving mode of automatically performing travel control of the vehicle 100 by recognizing the surrounding conditions of the vehicle 100 with a camera or radar (not shown) provided in the vehicle 100, without relying on the operation of the driving operation section by the driver D. The steering wheel 33 is in a steer-by-wire specification in which it is mechanically separated from a steering mechanism and the operation conditions are electrically detected. Likewise, the acceleration pedal 34 and the brake pedal 35 are also in the steer-by-wire specification in which they are mechanically separated from mechanism sections of operation targets and the operation conditions are electrically detected.

In the automated driving mode, basically, the driver D is not required to operate the driving operation section, which mitigates a driving burden, so that more opportunities for long hour moving are expected. Thus, the driver D continues to be seated on a driver's seat 5 over a long period of time and becomes lack of exercise, so that a target defect could occur.

Thus, while the vehicle 100 is traveling in the automated driving mode, the moving support device 1 utilizes the steering wheel 33, the acceleration pedal 34, and the brake pedal 35, which are not used in the automated driving mode and can be diverted to purposes other than driving operation because they are mechanically separated from the operation targets, so as to eliminate lack of exercise of the driver D, thereby performing a process of providing an environment allowing a comfortable moving time.

Specifically, the moving support device 1 displays, on the display 32, an operation recommendation image (corresponding to operation recommendation information of the present disclosure) to prompt an operation of any of the steering wheel 33, the acceleration pedal 34, and the brake pedal 35. The driver D who visually recognizes the operation recommendation image operates the steering wheel 33, the acceleration pedal 34, or the brake pedal 35 in accordance with an operation content designated by the operation recommendation image. In this manner, it is possible to provide, to the driver D, an environment allowing a comfortable moving period in the automated driving mode while suppressing lack of exercise.

2. Configuration of Moving Support Device

Figure 2:
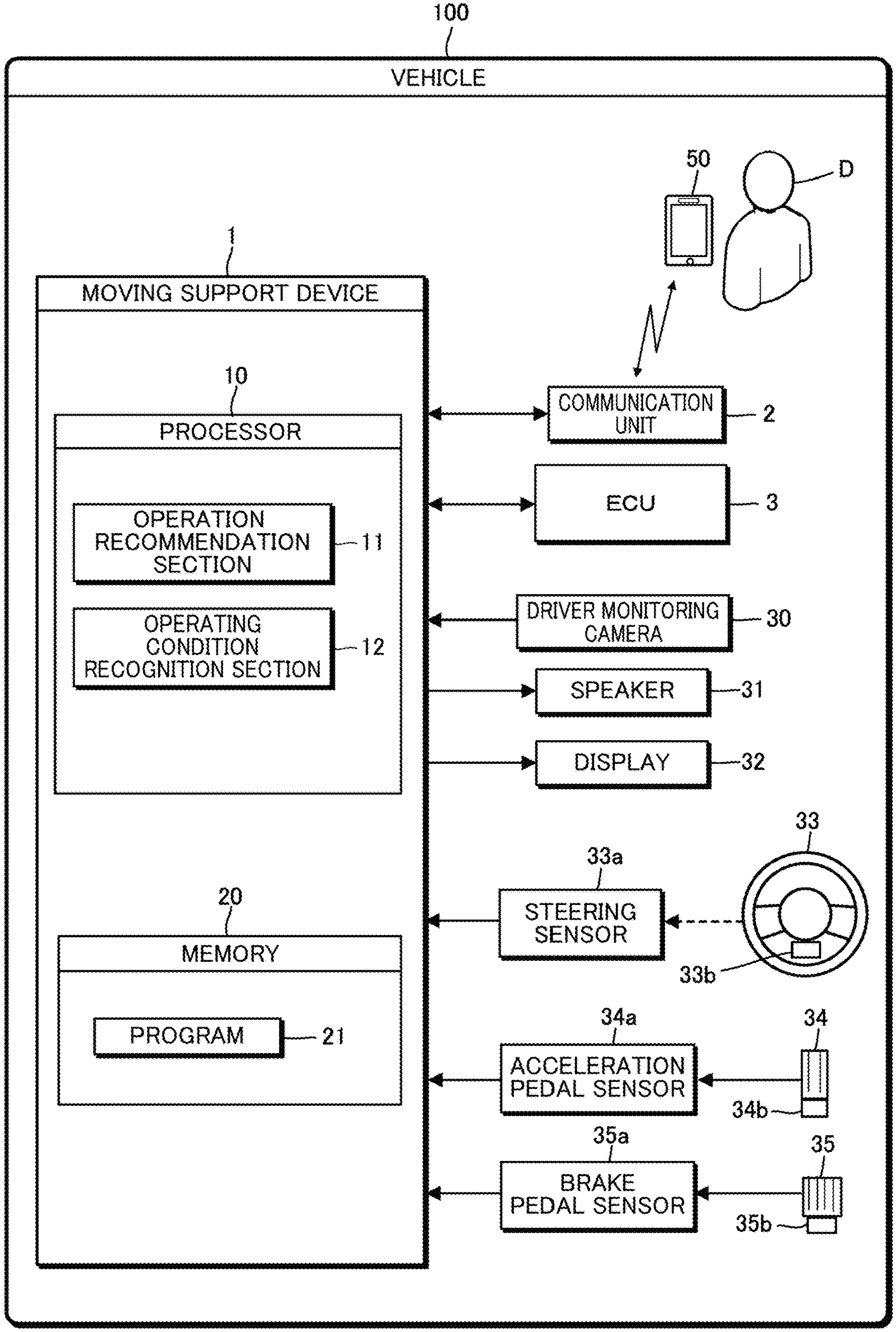
FIG. 2 is an explanatory view of the configuration of the moving support device.
Figure 3:
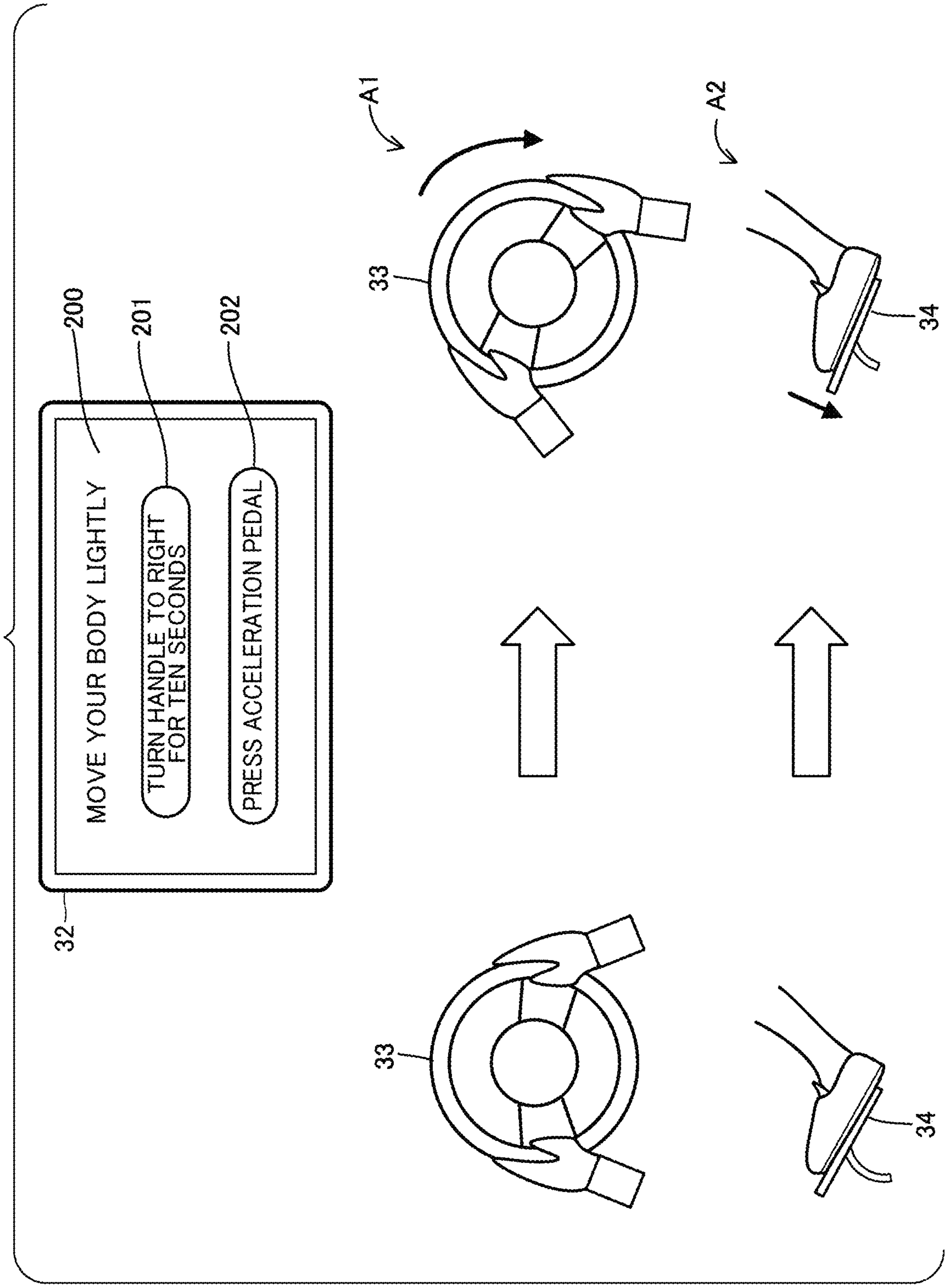
FIG. 3 is an explanatory view of an operation example of a driving operation section in accordance with operation recommendation information.

With reference to FIG. 2 and FIG. 3, the configuration of the moving support device 1 will be described. With reference to FIG. 2, the moving support device 1 is a control unit including a processor 10, a memory 20, and the like. The moving support device 1 may be a dedicated device and may be configured as part of the function of a control device provided in the vehicle 100, such as the ECU 3. The moving support device 1 is connected to the communication unit 2, the ECU 3, the driver monitoring camera 30, the speaker 31, the display 32, a steering sensor 33*a*, an acceleration pedal sensor 34*a*, and a brake pedal sensor 35*a*.

The driver monitoring camera 30 photographs the vicinity of the driver's seat 5 (see FIG. 1) including the driver D and inputs a photographed image to the moving support device 1. The steering sensor 33*a* detects a steering angle of the steering wheel 33 and inputs a detection signal to the moving support device 1. The acceleration pedal sensor 34*a* detects a pressing amount of the acceleration pedal 34 and inputs a detection signal to the moving support device 1. The brake pedal sensor 35*a* detects a pressing amount of the brake pedal 35 and inputs a detection signal to the moving support device 1.

The steering wheel 33 is an electric power steering and includes an actuator 33*b* to change an input level necessary for the operation of the steering wheel 33. The acceleration pedal 34 and the brake pedal 35 also respectively include actuators 34*b*, 35*b* to change input levels necessary for the operation.

The processor 10 reads and executes a program 21, which is stored in the memory 20, for control of the moving support device 1 so as to function as an operation recommendation section 11 and an operating condition recognition section 12. The process performed by the operation recommendation section 11 corresponds to an operation recommending step in a moving support method of the present disclosure.

The operation recommendation section 11 recognizes, through communication with the ECU 3, whether the vehicle 100 is traveling in the manual driving mode or in the automated driving mode. Further, when the vehicle 100 is traveling in the automated driving mode, as shown in FIG. 3, the operation recommendation section 11 displays, on the display 32, an operation recommendation image 200 to prompt the operation of the driving operation section.

The operation recommendation image 200 displays an image portion 201 to prompt the operation of the steering wheel (handle) 33 to the right for ten seconds and an image portion 202 to prompt the operation (pressing) of the pedal (acceleration pedal 34 or brake pedal 35). The driver D visually recognizes the operation recommendation image 200, and operates the steering wheel 33 in the right direction as denoted by A1 in accordance with the display of the image portion 201 and presses the pedal (in FIG. 3, acceleration pedal 34 is illustrated) as denoted by A2 in accordance with the display of the image portion 202. The operation recommendation section 11 sets the strength of the operation of the driving operation section to be increased as the travel continuation time in the automated driving mode becomes longer.

The operation recommendation section 11 changes the strength of the operation of the driving operation section with Technique 1 or Technique 2 below.

Technique 1. . . . The number of operations of the driving operation section is increased/decreased. By increasing the number of operations of the driving operation section to be prompted by the operation recommendation image, the operation strength of the driving operation section is increased.

Technique 2. . . . By increasing/decreasing the load by the actuators 33*b*, 34*b*, 35*b*, the input level necessary for the operation of the driving operation section is increased/decreased.

The operating condition recognition section 12 recognizes the operating condition of the steering wheel 33 based on a detection signal from the steering sensor 33*a*, recognizes the operating condition of the acceleration pedal 34 based on a detection signal from the acceleration pedal sensor 34*a*, and recognizes the operating condition of the brake pedal 35 based on a detection signal from the brake pedal sensor 35*a*. The operation recommendation section 11 performs a process of changing the display aspect of the operation recommendation image in accordance with the operating conditions of the steering wheel 33, the acceleration pedal 34, and the brake pedal 35 that are recognized by the operating condition recognition section 12. The details of this process will be described later.

3. Operation Recommendation Process

Following a flowchart shown in FIG. 4, procedures of an operation recommendation process performed by the moving support device 1 will be described. The moving support device 1 repeatedly performs the operation recommendation process according to the flowchart shown in FIG. 4 while the vehicle 100 is traveling in the automated driving mode.

Figure 4:
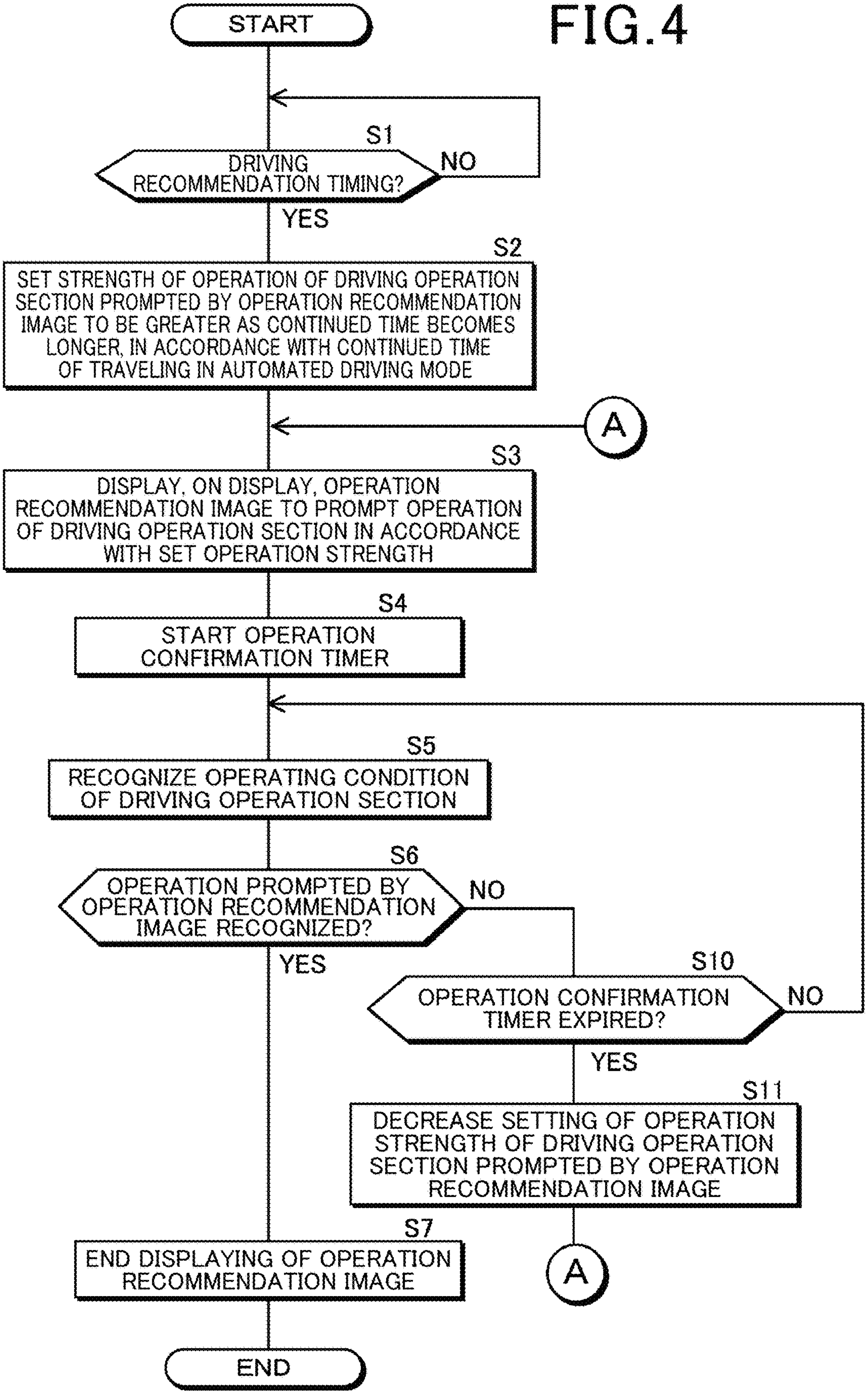
FIG. 4 is a flowchart of an operation recommendation process.

In step S1 of FIG. 4, when drive recommendation timing is reached, the operation recommendation section 11 advances the process to step S2. The drive recommendation timing is set, for example, when the vehicle 100 continues traveling for several ten minutes or longer in the automated driving mode. In step S2, the operation recommendation section 11 sets the operation strength of the driving operation section prompted by the operation recommendation image to be greater as the continued time of traveling in the automated driving mode becomes longer.

In the subsequent step S3, the operation recommendation section 11 displays, on the display 32, the operation recommendation image to prompt the operation of the driving operation section in accordance with the set operation strength. In the next step S4, the operation recommendation section 11 starts an operation confirmation timer to confirm the presence or absence of the operation of the driving operation section by the driver D. In the subsequent step S5, the operating condition recognition section 12 recognizes the operating condition of the driving operation section.

In the next step S6, the operation recommendation section 11 determines whether the operation of the operation content prompted by the operation recommendation image has been recognized by the operating condition recognition section 12. Then, the operation recommendation section 11 advances the process to step S7 when the operation of the operation content prompted by the operation recommendation image has been recognized, and advances the process to step S10 when the operation of the operation content prompted by the operation recommendation image has not been recognized. In step S7, the operation recommendation section 11 ends displaying of the operation recommendation image on the display 32.

In step S10, the operation recommendation section 11 determines whether the operation confirmation timer has expired, and advances the process to step S11 when the operation confirmation timer has expired, and retuns the process to step S5 when the operation confirmation timer has not expired yet. In step S11, the operation recommendation section 11 decreases the setting of the operation strength of the driving operation section that is prompted to the driver D by the operation recommendation image and advances the process to step S3. In this manner, in step S3, the operation recommendation section 11 displays, on the display 32, the operation recommendation image to prompt the operation of the driving operation section with the strength of the operation lower than the previous operation strength.

4. Other Embodiments

Figure 5:
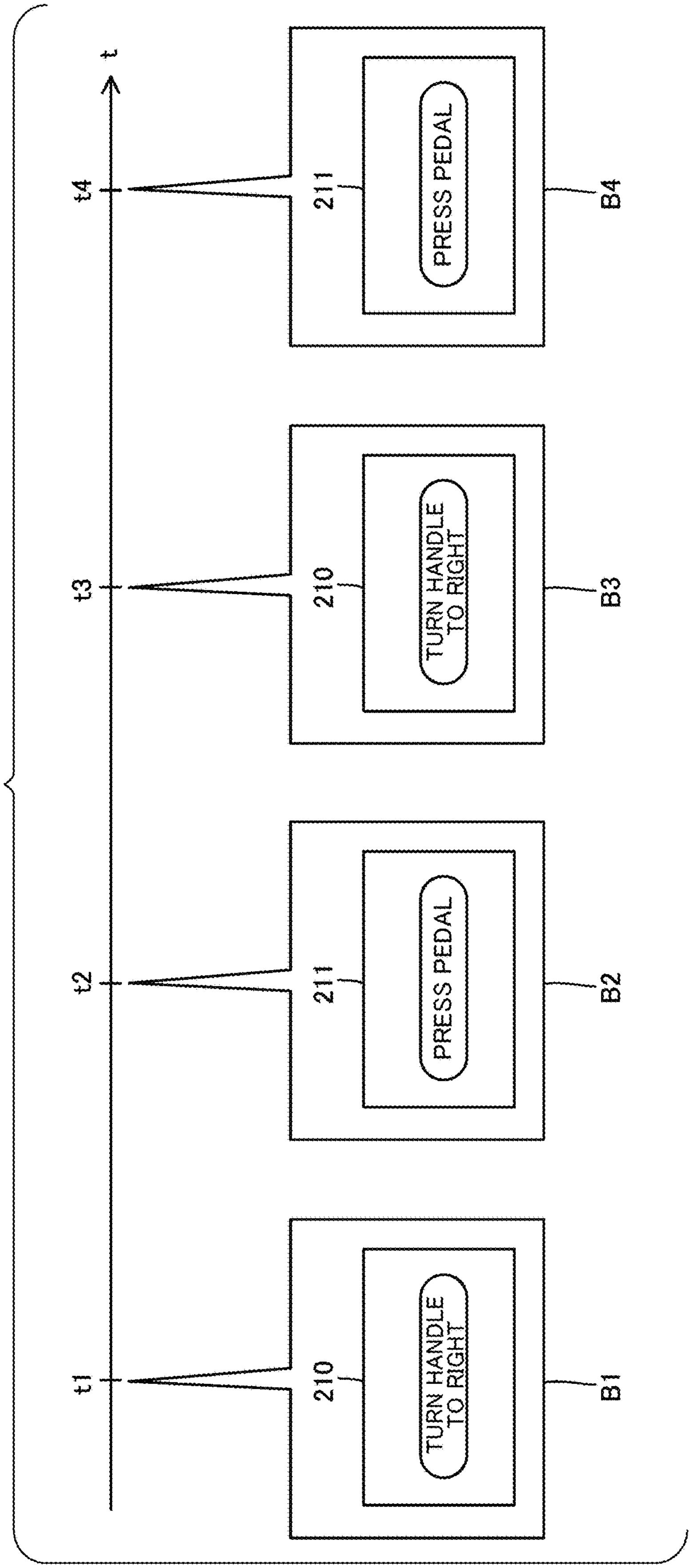
FIG. 5 is an explanatory view of an embodiment of alternately displaying operation recommendation information for an upper half body target and operation recommendation information for a lower half body target.

As shown in FIG. 5, as the operation recommendation image, an operation recommendation image for an upper half body target, 210 to prompt the operation of the steering wheel 33 (corresponding to the driving operation section for an upper half body of the present disclosure) that is operated by a site (here, hands) of the upper half body of the driver D and an operation recommendation image for a lower half body target, 211 to prompt the operation of the pedal (corresponding to the acceleration pedal 34 or the brake pedal 35, the driving operation section for a lower half body of the present disclosure) that is operated by a site (here, sole of foot) of the lower half body of the driver D may be alternately displayed.

FIG. 5 shows display timing of the operation recommendation image with a time axis t, and the operation recommendation section 11 displays, on the display 32, the operation recommendation image for the upper half body target, 210 to prompt the operation of the steering wheel 33 at t1 and t3, and displays, on the display 32, the operation recommendation image for the lower half body target, 211 to prompt the operation of the pedal at t2 and t4. In this manner, by alternately displaying, on the display 32, the operation recommendation image for the upper half body target, 210 and the operation recommendation image for the lower half body target, 211, it is possible to cause the driver D to perform well-balanced upper half body and lower half body exercise. The operation recommendation image for the upper half body target corresponds to the operation recommendation information for the upper half body target of the present disclosure, and the operation recommendation image for the lower half body target corresponds to the operation recommendation information for the lower half body target of the present disclosure.

In the aforementioned embodiment, the vehicle 100 has been illustrated as the mobile body of the present disclosure, but the present invention is also applicable to the mobile body of the present disclosure of any other type (aircrafts, vessels, or the like) capable of switching between the manual driving mode and the automated driving mode and including the driving operation section.

In the aforementioned embodiment, the operation recommendation section 11 displays the operation recommendation image on the display 32, but may display the operation recommendation image on a display section of the communication terminal 50 through communication with the communication terminal 50 via the communication unit 2. In this case, the communication terminal 50 corresponds to the information output device of the present disclosure.

In the aforementioned embodiment, the operation recommendation section 11 displays the operation recommendation image on the display 32 as the operation recommendation information of the present disclosure, but may output, from the speaker 31, an operation recommendation voice to prompt the operation of the driving operation section with a voice, as the operation recommendation information of the present disclosure. Alternatively, the operation recommendation section 11 may display the operation recommendation image on the display 32 and also output the operation recommendation voice from the speaker 31. Further, through communication with the communication terminal 50 via the communication unit 2, the operation recommendation voice may be output from a speaker of the communication terminal 50. In this case, the communication terminal 50 corresponds to the information output device of the present disclosure.

In the aforementioned embodiment, the example of the moving support device 1 mounted on the vehicle 100 has been illustrated, but the moving support device of the present disclosure may be configured with an application (application program) of the communication terminal 50. In this case, the communication terminal 50 recognizes, through communication with the ECU 3, whether the vehicle 100 is traveling in the manual driving mode or in the automated driving mode, and recognizes the operating conditions of the driving operation section. Further, the configuration is made such that the communication terminal 50 displays the operation recommendation image on the display section of the communication terminal 50 or on the display 32 of the vehicle 100 and the operation recommendation voice is output from the speaker of the communication terminal 50 or the speaker 31 of the vehicle 100.

In the aforementioned embodiment, as the driving operation section, the steering wheel 33, the acceleration pedal 34, and the brake pedal 35 have been illustrated, but the driving operation section may be another driving operation section, such as a control stick or a ladder pedal when the mobile body is an aircraft.

In the aforementioned embodiment, the operating condition recognition section 12 recognizes the operating conditions of the driving operation section based on the detection signals from the steering sensor 33*a*, the acceleration pedal sensor 34*a*, and the brake pedal sensor 35*a*. As another embodiment, the operating condition recognition section 12 may recognize the operating conditions of the driving operation section by the driver D by extracting an image portion of the driver D from a photographed image of the driver monitoring camera 30.

In the aforementioned embodiment, with the inclusion of the operating condition recognition section 12, the operating conditions of the driving operation section by the driver D are recognized, but the operating condition recognition section 12 may be omitted so as to solely output the operation recommendation information from the operation recommendation section 11.

Note that FIG. 2 is a schematic view of the configuration of the moving support device 1 by sectioning it by main process contents to facilitate understanding of the present invention, but the moving support device 1 may be configured with other sectioning. Further, the process of each constituent element may be executed by one hardware unit or a plurality of hardware units. In addition, the process by each constituent element shown in FIG. 4 may be executed with one program or a plurality of programs.

4. Configurations Supported by the Aforementioned Embodiment

The aforementioned embodiment is a specific example of the following configurations.

(Configuration 1) A moving support device used in a mobile body, the mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver, in which the moving support device includes an operation recommendation section that outputs operation recommendation information to prompt the operation of the driving operation section from an information output device that outputs information by means of at least one of an image or a sound used in the mobile body, while the mobile body moves in the automated driving mode.

According to the moving support device of Configuration 1, it is possible to provide an environment allowing a more comfortable moving time using the driving operation section when the driver of the mobile body, such as a vehicle, moves by setting automated driving.

(Configuration 2) The moving support device according to Configuration 1, including an operating condition recognition section that recognizes an operating condition of the driving operation section by the driver, in which the operation recommendation section is configured to: output, from the information output device, the operation recommendation information designating an operation content to the driving operation section; and stop outputting the operation recommendation information from the information output device when the operating condition recognition section recognizes the operation of the driving operation section in accordance with the operation content having been performed after outputting of the operation recommendation information from the information output device is started.

According to the moving support device of Configuration 2, when the driver appropriately performs the operation of the driving operation section prompted by the operation recommendation information, it is possible to avoid the driver from feeling bothered due to continued outputting of the operation recommendation information, despite the operation of the driving operation section being performed by stopping outputting the operation recommendation information.

(Configuration 3) The moving support device according to Configuration 1 or Configuration 2, including an operating condition recognition section that recognizes an operating condition of the driving operation section by the driver, in which the operation recommendation section is configured to: output, from the information output device, the operation recommendation information designating an operation content to the driving operation section; and output, from the information output device, the operation recommendation information designating an operation content with a strength of the operation of the driving operation section lower than the strength of the operation of the driving operation section designated by the operation content of the operation recommendation information previously outputted, when the operating condition recognition section does not recognize the operation of the driving operation section in accordance with the operation content having been performed after the operation recommendation information is outputted from the information output device and before a predetermined time elapses.

According to the moving support device of Configuration 3, when it is assumed that the operation of the driving operation section was difficult since the driver did not perform the operation of the driving operation section prompted by the operation recommendation information, it is possible to facilitate the operation of the driving operation section to be performed again by the driver, by outputting the operation recommendation information with the strength of the operation of the driving operation section decreased.

(Configuration 4) The moving support device according to any one of Configuration 1 to Configuration 3, in which the operation recommendation section increases a strength of the operation of the driving operation section prompted by the operation recommendation information as a moving continuation time of the mobile body in the automated driving mode becomes longer.

According to the moving support device of Configuration 4, it is assumed that the driver is more likely to feel unwell or the like due to lack of exercise as the moving continuation time becomes longer. Thus, by increasing the strength of the operation of the driving operation section to be prompted by the operation recommendation information so as to increase the effect of eliminating lack of exercise, the driver's health condition can be expected to be kept well.

(Configuration 5) The moving support device according to Configuration 3 or Configuration 4, in which the operation recommendation section changes the strength of the operation of the driving operation section prompted by the operation recommendation information by changing the number of the operations of the driving operation section prompted by the operation recommendation information.

According to the moving support device of Configuration 5, by changing the number of the operations of the operation section of the driving operation section, the strength of the operation of the driving operation section can be easily changed.

(Configuration 6) The moving support device according to Configuration 3 or Configuration 4, in which the driving operation section has a function of changing an input level necessary for the operation, and the operation recommendation section changes the strength of the operation of the driving operation section prompted by the operation recommendation information by changing the input level necessary for the operation of the driving operation section.

According to the moving support device of Configuration 6, by utilizing the function of changing the necessary level that is provided in the driving operation section, the strength of the operation of the driving operation section can be changed.

(Configuration 7) The moving support device according to any one of Configuration 1 to Configuration 6, in which the driving operation section includes: a driving operation section for an upper half body operated by a site of the upper half body of the driver; and a driving operation section for a lower half body operated by a site of the lower half body of the driver, the operation recommendation information includes: operation recommendation information for an upper half body target that prompts the operation of the driving operation section for the upper half body; and operation recommendation information for a lower half body target that prompts the operation of the driving operation section for the lower half body, and the operation recommendation section alternately outputs, from the information output device, the operation recommendation information for the upper half body target and the operation recommendation information for the lower half body target.

According to the moving support device of Configuration 7, it is possible to prompt the driver to perform upper half body exercise through the operation of the driving operation section for the upper half body and lower half body exercise through the operation of the driving operation section for the lower half body in a well-balanced manner.

(Configuration 8) A moving support method executed by a computer used in a mobile body, the mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver, in which the moving support method includes an operation recommending step of outputting operation recommendation information to prompt the operation of the driving operation section from an information output device that outputs information by means of at least one of an image or a sound used in the mobile body, while the mobile body moves in the automated driving mode.

By executing the moving support method of Configuration 8 with the computer, the same function and effect as those of the moving support device of Configuration 1 can be obtained.

(Configuration 9) A non-transitory computer-readable storage medium storing a program configured to cause a computer to function as an operation recommendation section, the computer used in a mobile body including: a driving operation section mechanically separated from a mechanism section for an operation target; and a moving control section that switches between a manual driving mode of performing a moving control in accordance with an operation of the driving operation section by a driver and an automated driving mode of performing the moving control that is automated without relying on the operation of the driving operation section by the driver, in which the operation recommendation section outputs operation recommendation information to prompt the operation of the driving operation section from an information output device that outputs information by means of at least one of an image or a sound used in the mobile body, while the mobile body moves in the automated driving mode.

By executing the program of Configuration 9 with the computer, the configuration of the moving support device of Configuration 1 can be implemented.

REFERENCE SIGNS LIST

1 moving support device
2 communication unit
3 ECU
10 processor
11 operation recommendation section
12 operating condition recognition section
20 memory
21 program
30 driver monitoring camera
31 speaker
32 display
33 steering wheel
33*a* steering sensor
34 acceleration pedal
34*a* acceleration pedal sensor
35 brake pedal
35*a* brake pedal sensor
50 communication terminal
100 vehicle
200 operation recommendation image
D driver

The invention claimed is:

1. A moving support device used in a mobile body, the mobile body comprising:

a driving operation section; and an Electronic Control Unit (ECU) that switches between a manual driving mode of performing a moving control in accordance with an operation of the driving operation section by a driver and an automated driving mode of performing the moving control that is automated without relying on the operation of the driving operation section by the driver, wherein in the automated driving mode, the driving operation section is mechanically separated from a mechanism section which is an operation target of the driving operation section, the moving support device comprises a processor that outputs operation recommendation information to prompt the operation of the driving operation section via at least one of an image on a display and or a sound from a speaker, while the mobile body moves in the automated driving mode, the display and the speaker being provided in the mobile body, the processor increases an input load necessary for the operation of the driving operation section or a number of the operations of the driving operation section as a moving continuation time of the mobile body in the automated driving mode becomes longer, the input load and the number of the operations being prompted by the operation recommendation information.

2. The moving support device according to claim 1, wherein the processor is configured to recognize an operating condition of the driving operation section by the driver, the processor is configured to:

output the operation recommendation information designating an operation content to the driving operation section; and stop outputting the operation recommendation information when recognizing the operation of the driving operation section in accordance with the operation content having been performed after outputting of the operation recommendation information is started.

3. The moving support device according to claim 1, wherein the processor is configured to recognize an operating condition of the driving operation section by the driver, the processor is configured to:

output the operation recommendation information designating a first operation content to the driving operation section; and output the operation recommendation information designating a second operation content in which a corresponding input load or a corresponding number of the operations is decreased than relative to corresponding input load or a corresponding number of the operations of the first operation content when the processor does not recognize the operation of the driving operation section in accordance with the first operation content having been performed within a predetermined time after the operation recommendation information designating the first operation content is outputted.

4. The moving support device according to claim 1, wherein the driving operation section comprises:

a driving operation section for an upper half body operated by a site of the upper half body of the driver; and a driving operation section for a lower half body operated by a site of the lower half body of the driver, the operation recommendation information comprises:

operation recommendation information for an upper half body target that prompts the operation of the driving operation section for the upper half body; and operation recommendation information for a lower half body target that prompts the operation of the driving operation section for the lower half body, and the processor alternately outputs the operation recommendation information for the upper half body target and the operation recommendation information for the lower half body target.

5. A moving support method executed by a computer used in a mobile body, the mobile body comprising:

a driving operation section; and an Electronic Control Unit (ECU) that switches between a manual driving mode of performing a moving control in accordance with an operation of the driving operation section by a driver and an automated driving mode of performing the moving control that is automated without relying on the operation of the driving operation section by the driver, wherein in the automated driving mode, the driving operation section is mechanically separated from a mechanism section which is an operation target of the driving operation section, the moving support method comprises an operation recommending step of outputting operation recommendation information to prompt the operation of the driving operation section via at least one of an image on a display and er a sound from a speaker, while the mobile body moves in the automated driving mode, the display and the speaker being provided in the mobile body, the operation recommending step increases an input load necessary for the operation of the driving operation section or a number of the operations of the driving operation section as a moving continuation time of the mobile body in the automated driving mode becomes longer, the input load and the number of the operations being prompted by the operation recommendation information.

6. A non-transitory computer-readable storage medium storing a program configured to cause a computer to function as an operation recommendation section, the computer used in a mobile body comprising: a driving operation section; and an Electronic Control Unit (ECU) that switches between a manual driving mode of performing a moving control in accordance with an operation of the driving operation section by a driver and an automated driving mode of performing the moving control that is automated without relying on the operation of the driving operation section by the driver, wherein in the automated driving mode, the driving operation section is mechanically separated from a mechanism section which is an operation target of the driving operation section, the operation recommendation section outputs operation recommendation information to prompt the operation of the driving operation section via at least one of an image on a display and a sound from a speaker, while the mobile body moves in the automated driving mode, the display and the speaker being provided in the mobile body, the operation recommendation section increases an input load necessary for the operation of the driving operation section of a number of the operations of the driving operation section as a moving continuation time of the mobile body in the automated driving mode becomes longer, the input load and the number of the operations being prompted by the operation recommendation information.

7. The moving support device according to claim 1, wherein the driving operation section has an actuator, and the processor increases or decreases the input load by increasing or decreasing an actuator load of the actuator.

8. The moving support device according to claim 1, comprising a sensor that detects the operation of the driving operation section, wherein the processor recognizes the operating condition of the driving operation section based on a detection signal of the sensor.

* * * * *